United States Patent
Fiorone et al.

(10) Patent No.: US 9,203,732 B2
(45) Date of Patent: Dec. 1, 2015

(54) RECOVERY OF TRAFFIC IN A CONNECTION-ORIENTED NETWORK

(75) Inventors: Raoul Fiorone, Genoa (IT); Andrea Corti, Varazze (IT); Riccardo Martinotti, Savona (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 200 days.

(21) Appl. No.: 13/496,597

(22) PCT Filed: Oct. 1, 2009

(86) PCT No.: PCT/EP2009/062755
§ 371 (c)(1), (2), (4) Date: Apr. 5, 2012

(87) PCT Pub. No.: WO2011/032608
PCT Pub. Date: Mar. 24, 2011

(65) Prior Publication Data
US 2012/0188867 A1    Jul. 26, 2012

(30) Foreign Application Priority Data
Sep. 16, 2009  (EP) .................... 09170420

(51) Int. Cl.
*H04L 12/26* (2006.01)
*H04L 12/701* (2013.01)
(Continued)

(52) U.S. Cl.
CPC ............. *H04L 45/00* (2013.01); *H04L 43/0811* (2013.01); *H04L 45/22* (2013.01); *H04L 45/28* (2013.01); *H04L 45/50* (2013.01)

(58) Field of Classification Search
CPC ......... H04L 12/18; H04L 12/24; H04L 12/56; H04L 12/26; H04L 45/22; H04L 45/00; H04J 3/14; G01R 31/08
USPC ......... 370/216, 218, 227–230, 235, 241, 242, 370/244, 217, 225, 254, 256, 465, 221; 709/239; 398/5, 1, 17
See application file for complete search history.

(56) References Cited

U.S. PATENT DOCUMENTS 5,793,745 A * 8/1998 Manchester .................. 370/224
6,778,492 B2   8/2004 Charny et al.
(Continued)

FOREIGN PATENT DOCUMENTS

| CN | 1848844 A   | 10/2006 |
| CN | 100397088 C | 6/2008  |
| EP | 1 788 757   | 5/2007  |

OTHER PUBLICATIONS

English translation of the Chinese Search Report mailed Dec. 25, 2013 in Chinese Patent Application 200980161561.7.
(Continued)

*Primary Examiner* — Jamal Javaid
*Assistant Examiner* — Wali Butt
(74) *Attorney, Agent, or Firm* — Nixon & Vanderhye, P.C.

(57) ABSTRACT

A connection-oriented network (5) has a plurality of connections terminated at a first node (N6). A recovery group (A) is configured at the first node (N6) comprising at least two of the plurality of connections (LSP1-6, LSP2-6, LSP3-6, LSP4-6). Fault detection is performed over each of the connections in the recovery group (A) and the node determines if at least one recovery group fault condition is met, based on the results of the fault detections performed over the connections in the recovery-group (A). When the at least one recovery group fault condition is met, the node causes traffic on the plurality of connections in the recovery group (A) to be transferred to backup paths. When the at least one recovery group fault condition is not met, and a fault has been detected on a connection in the recovery group (A), the node causes traffic to be transferred from that connection to a backup path.

19 Claims, 8 Drawing Sheets

(51) Int. Cl.
*H04L 12/707* (2013.01)
*H04L 12/703* (2013.01)
*H04L 12/723* (2013.01)

(56) References Cited

U.S. PATENT DOCUMENTS

| | | | |
|---|---|---|---|
| 6,952,395 | B1 | 10/2005 | Manoharan et al. |
| 7,043,250 | B1* | 5/2006 | DeMartino ............... 455/445 |
| 7,333,438 | B1* | 2/2008 | Rabie et al. ............. 370/242 |
| 7,756,019 | B2* | 7/2010 | Zhai ........................ 370/228 |
| 7,804,767 | B1* | 9/2010 | Owens et al. ........... 370/217 |
| 2007/0159961 | A1* | 7/2007 | Zhai ........................ 370/217 |
| 2009/0245783 | A1* | 10/2009 | So .............................. 398/5 |
| 2010/0309778 | A1* | 12/2010 | Young ...................... 370/219 |

OTHER PUBLICATIONS

Network Working Group, RFC 4427, Mannie et al, "Recovery (Protection and Restoration) Terminology for Generalized Multi-Protocol Label Switching (GMPLS)", Alcatel, Mar. 2006.

Itu-T, International Telecommunication Union, Telecommunication Standardization Sector of ITU, G.808.1, "Series G: Transmission Systems and Media, Digital Systems and Networks, Digital Networks—General Aspects", Generic Protection Switching—Linear Trail and Subnetwork Protection, (Dec. 2003).

International Search Report for PCT/EP2009/062755, mailed Jan. 4, 2010.

Papadimitriou, D. et al., "Analysis of Generalized Multi-Protocol Label Switching (GMPLS)-based Recovery Mechanisms (including Protection and Restoration); draft-ietf-ccamp-gmpls-recovery-analysis-05.txt", IETF, CH, vol. ccamp, No. 5, (Apr. 1, 2005), 42 pages.

International Telecommunication Union, "Generic protection switching—Linear trail and subnetwork protection; G.808.1 (03/06)", ITU-T Draft Study Period 2005-2008, (Mar. 29, 2006), 68 pages.

Makam, S. et al., "Framework for MPLS-based Recovery; draft-makam-mpls-recovery-frmwrk-01.t", IEFT, CH., No. 1, (Jul. 1, 2000), 35 pages.

\* cited by examiner

| Connection Administrative Status | Working Path Status | Protecting Path Status | Action | |
|---|---|---|---|---|
| | | | Revertive | Non-revertive |
| Working path is providing service | active | active | Keep in Protection group | Keep in Protection group |
| Working path is providing service | active | faulty | Take out of Protection group | Take out of Protection group |
| Protecting path is providing service | faulty | active | Take out of Protection group (1) | Take out of Protection group (1) |
| Protecting path is providing service | active | active | - (2) | Keep in or take out of Protection group (3) |
| Manual commands are in place | - | - | Take out of Protection group | Take out of Protection group |

(1) this can happen either for individual connection switch or for protection group switch
(2) in case of revertive operation, as soon as the working path becomes available again, the traffic is transferred back to it (usually after a wait-to-restore time)
(3) if all connections in the group are not-revertive, a typical behaviour could be to keep the connection in the protection group.

N.B. if not all connections in the group are not-revertive, the network operator may chose to take the connection out of the protection group or keep it in the protection group

Fig. 6

RECOVERY OF TRAFFIC IN A CONNECTION-ORIENTED NETWORK

This application is the U.S. national phase of International Application No. PCT/EP2009/062755, filed 1 Oct. 2009, which designated the U.S. and claims priority to EP Application No. 09170420.5, filed 16 Sep. 2009, the entire contents of each of which are hereby incorporated by reference.

TECHNICAL FIELD

This invention relates to recovery of traffic in a connection-oriented network.

BACKGROUND

Packet Switched Networks are replacing legacy Time Division Multiplexing (TDM) based networks, such as Synchronous Digital Hierarchy (SDH) networks, for their capability to handle data traffic like Ethernet and IP in a more optimised and flexible manner. Connection Oriented Packet Switched (CO-PS) Networks are an ideal candidate for the migration from legacy TDM networks toward all-packet networks for their capability of end-to-end resilience and performance monitoring and for their manageability.

In order to replace legacy SDH networks, CO-PS Networks are required to guarantee transport-grade performance and provide the same resilience to faults offered by legacy transport networks. Typically, transport networks are required to switch to a protection path within 50 ms of a fault occurring. The sub 50 ms protection switching requirement is a difficult requirement to fulfill in SDH networks, especially when a high number of simultaneous protection switching instances needed to be managed, and it is an even greater challenge for CO-PS Networks.

One type of CO-PS network technology is Multi-Protocol Label Switching Transport Profile (MPLS-TP), which is being developed as a transport profile of Multi-Protocol Label Switching (MPLS). MPLS-TP aims to provide a similar "look and feel" as SDH with inherent interoperability capability with existing IP/MPLS networks. In MPLS-TP networks Label Switched Path (LSP) tunnels are created between network nodes which are required to communicate with one another. Transport units (e.g. packets) include a shim header which contains the label that identifies a specific tunnel. In order to increase the availability of the network, LSP tunnels usually need to be made redundant, using some network protection scheme. In the case of MPLS-TP this typically means 1+1 or 1:1 end-to-end protection schemes.

In MPLS, which can also be used as a CO technology, no end-to-end protection exists but only local repair mechanisms and restoration. A problem is that when a high number of LSP tunnels are present in a network and need to be protected, there is likely to be a high number of simultaneous protection switches at a node. The number of simultaneous protection switch events that may take place at a node are dependent upon traffic relationships between the nodes, network topology and network design, as well as the type of fault that has occurred. Protection is governed by Operations, Administration and Management (OAM) packets which, for fast protection, are sent at short intervals (typically 3.3 ms) and need to be processed by the receiving node. Mechanisms for declaring a failure of an LSP tunnel include: lack of connectivity verification (e.g. three consecutive periodic OAM packets are not received) or explicit fault indication messages such as Forward Defect Indication (FDI).

The number of protection instances that may need to be simultaneously switched at a node can be high. In addition, where traffic is carried over LSP tunnels by Pseudo Wires (PW), which is the typical case for MPLS-TP to transport Ethernet and TDM/ATM clients, the PW level can be protected with another level of OAM, which further increases the number of protection switches that must be performed. One possible solution to meet the 50 ms protection switching requirement is LSP nesting. LSP nesting creates a hierarchy of LSPs so that a multitude of inner LSPs are transported by an outer LSP for a given network portion. The outer LSP is the entity on which traffic protection is performed in that network portion. This requires the creation of an additional layer in the network and has the restriction of providing a solution only in that network portion.

International Telecommunications Union (ITU-T) Recommendation G.808.1 "Generic Protection Switching—Linear trail subnetwork protection" describes a mechanism called Group Trail Protection. A group of working path and protection path connections are configured between a common pair of network end points. All working paths and protection paths are required to connect the same pair of end nodes and to follow the same route. Logic at the receiving node merges individual trail signal fail (TSF) signals into a single SF Group (SFG) and merges individual trail signal degrade (TSD) signals into a single SD Group (SDG). In the case of 1:1 protection, an Automatic Protection Switching (APS) message has to be sent for the whole group. Protection is activated for the entire group when the SFG signal is active. Three policies are described by G.808.1 to generate an SFG: (1) all members of the protection group are failed, i.e. SFG is declared in case individual signals are in TSF; (2) one selected member is failed, i.e. an individual signal is chosen as reference signal and SFG is declared in case TSF of the reference signal is active; (3) a given percentage of members are failed, i.e. only if the number of active TSF exceeds a given threshold, SFG is active.

The present invention seeks to provide an alternative method of protecting traffic in a network.

SUMMARY

An aspect of the present invention provides a method of performing fault detection and traffic recovery at a first node in a connection-oriented network, the network comprising a plurality of connections which are terminated at the first node, the method comprising:
  configuring at the first node a recovery group comprising at least two of the plurality of connections;
  performing fault detection over each of the plurality of connections in the recovery group;
  determining if at least one recovery group fault condition is met, based on the results of the fault detections performed over the plurality of connections in the recovery group and:
  when the at least one recovery group fault condition is met, causing traffic on the plurality of connections in the recovery group to be transferred to backup paths and;
  when the at least one recovery group fault condition is not met, and a fault has been detected on a connection in the recovery group, causing traffic to be transferred from that connection to a backup path.

The term "recovery" is intended to include "protection", which typically means that a backup path is preconfigured in advance of detecting any fault or failure, as well as "restoration", which typically means that signalling to configure a backup path occurs after detection of failure. The method allows switching to a backup path to occur more quickly for a group of connections, as it is not necessary to wait until the node has detected a fault on each individual connection in the group. An advantageous embodiment of the method is used for protection switching to a preconfigured backup (protection) path.

The method can be applied to any network topology and is applicable to a range of different end-to-end recovery mechanisms without being dependent upon the specific protection mechanism actually used. The method can operate without any additional OAM signalling over that already used in networks, and without requiring an additional network layer to be managed. Only the node at which connections are terminated needs to be aware of the existence of the recovery group. This allows single ended management and is advantageous where the receiving node is located in a different network domain to other terminating nodes of the connections.

There is no requirement for the connections within the recovery group to follow the same path route within the network and the connections within the recovery group can have different remote nodes.

This invention can be applied to any kind of connection-oriented technology, such as a Generalised Multi-Protocol Label Switching (GMPLS), Multi-Protocol Label Switching (MPLS), Multi-Protocol Label Switching Transport Profile (MPLS-TP) network, connection-oriented Ethernet or Provider Backbone Bridging Traffic Engineering (PBB-TE), IEEE 802.1Qay.

Another aspect of the invention provides apparatus for performing the method at a node.

A further aspect of the invention provides a method of configuring fault detection and traffic recovery at a first node in a connection-oriented network, the network comprising a plurality of connections which are terminated at the first node (N6), the method comprising, at a node separate from the first node:

signalling to configure a recovery group at the first node, wherein the signalling:
defines a recovery group comprising at least two of the plurality of connections terminated at the first node;
defines at least one recovery group fault condition which must be met, to cause a recovery group fault condition to be declared for all of the connections in the recovery group;

wherein when the at least one recovery group fault condition is met, traffic on the plurality of connections in the recovery group will be transferred to backup paths and when the at least one recovery group fault condition is not met, and a fault has been detected on a connection in the recovery group, traffic will be transferred from that connection to a backup path.

The functionality described here can be implemented in software, hardware or a combination of these. The functionality can be implemented by means of hardware comprising several distinct elements and by means of a suitably programmed processing apparatus. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable instructions can be downloaded to a processing apparatus via a network connection.

BRIEF DESCRIPTION OF THE DRAWINGS

Embodiments of the invention will be described, by way of example only, with reference to the accompanying drawings in which:

FIG. 6 shows a table of possible ways of operating members of a protection group;

DETAILED DESCRIPTION

Figure 1:
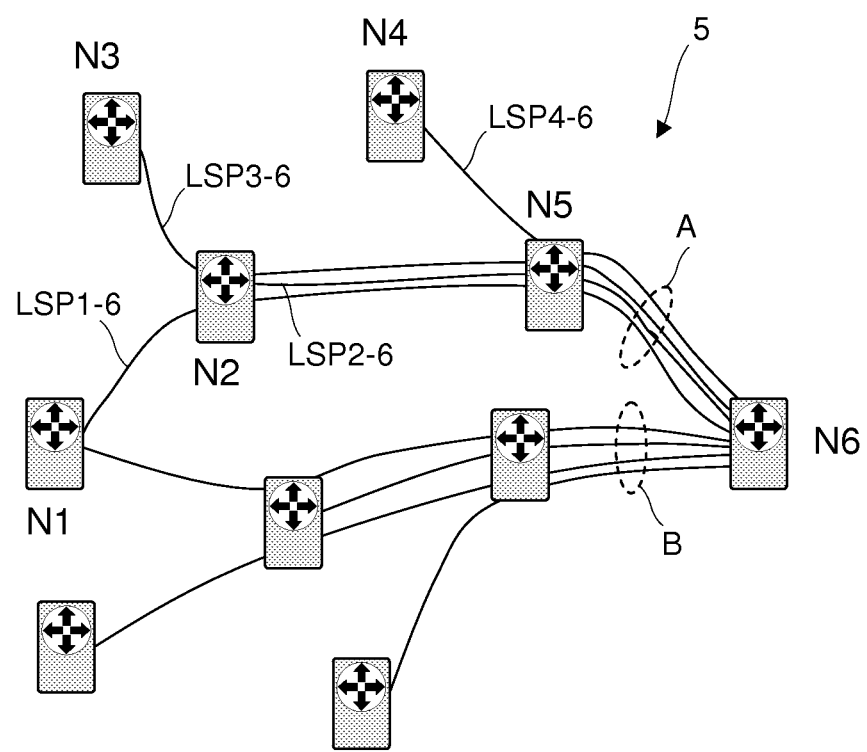
FIG. 1 shows an example network with connections and recovery groups.

FIG. 1 shows an example communication network comprising a set of nodes connected by communication links 11, which can use optical, electrical, wireless or any other technology. Connections are shown between each of nodes N1-N4 and node N6. A connection LSP1-6 connects N1 to node N6 via nodes N2 and N5. A connection LSP2-6 connects node N2 to node N6 via node N5. A connection LSP3-6 connects N3 to node N6 via nodes N2 and N5. A connection LSP4-6 connects node N4 to node N6 via node N5. Each connection shown in FIG. 1 can be implemented as a Label Switched Path (LSP), a PseudoWire (PW) over a LSP, or any other form of connection-oriented technology. Multiple connections can be carried over a common physical path between a pair of nodes, or by multiple physical paths between a pair of nodes.

Operations, Administration and Management (OAM) signalling is performed in the network. One type of OAM signalling is connectivity verification signalling. This type of signalling periodically sends a message which includes a Continuity Check (CC) field between endpoint nodes of each of the connections shown in FIG. 1. So, for example, nodes N1 and N6 exchange CC signalling messages. If CC messages are not received within a predetermined time period, this is indicative of a fault along the connection.

Other types of OAM signalling include: a forward defect indication (FDI) type of message, whose role is to immediately inform the receiving node of a failure detected by an intermediate node along the path, thus speeding up protection switching; an Automatic Protection Switch type of message. One type, or multiple types, of OAM messages can be present in the network and used by the node which manages the recovery group.

In the example of FIG. 1 a recovery group A is configured for the set of four connections (LSP1-6, LSP2-6, LSP3-6, LSP4-6) terminated at node N6. A different recovery group B is configured for the set of connections shown in the lower half of FIG. 1. The recovery group allows node N6 to collectively manage the group of connections for traffic recovery purposes. For clarity a small number of LSP tunnels is shown in FIG. 1 but the number of the protection instances, which can be associated to LSP tunnels and/or PWs, can be significant, for a high density metropolitan network or for a core network it can easily be in the order of several hundreds.

The recovery group has a condition, or a set of conditions, that are used to decide when traffic recovery (e.g. protection switching) will occur for the group of connections. One suitable condition is a threshold value of connections that report a fault. The threshold can be expressed as an absolute value (e.g. 5, 10) or a percentage or proportion of the total number of connections in the group (e.g. 50%). Once the threshold value has been reached, the entire group of connections in the recovery group are declared failed and the protection procedure is initiated for all members of the group according to the characteristics of the protection mechanism in place. No further processing of OAM messages for individual connections within the group needs to occur following this point for the protection switch to occur. A protection switch occurs (immediately) on any individual connection, or connections, on which a fault has been detected. The protection switching of individual connections occurs irrespective of whether the requirements have been met for the group to be declared failed, thereby allowing traffic to be switched from individual failed connections without delay.

The recovery group is configured at the node N6. A feature of the recovery group is that can be locally configured and managed by one node, and the existence of the recovery group does not need to be known by any other node in the network. In summary, the recovery group can be managed single-ended. This allows the recovery group mechanism to be used with third party systems, such as other network domains or network operators, who are not aware of recovery groups. A further feature of the recovery group mechanism is that it does not require a specific network layer or OAM to manage the recovery group.

FIG. 1 shows an example set of LSPs between nodes of the network. A single LSP can carry multiple Pseudo Wires (PW). Each PW can have its own OAM signalling and can have a preconfigured protection instance associated with it. In FIG. 1 only working paths are shown. A preconfigured backup path exists for each working path. There can be a 1:1 relationship between a working path and a backup path (i.e. a dedicated backup path exists for each working path) or an N:1 relationship between a working path and a backup path (i.e. a backup path is shared between N working paths). The group of connections will be called a "protection group" in the following description, as the working paths each have a preconfigured backup (protection) path.

In a conventional system a fault on a particular connection causes a protection switch to a backup path for just that connection. In the present invention a node which manages a protection group (A) causes a protection switch to occur for the group of connections in the group (A) when the fault signalling received by the node meets a certain condition, or set of conditions. For example, the condition can be that at least 50% of the connections in the protection group report a fault.

Figure 2:
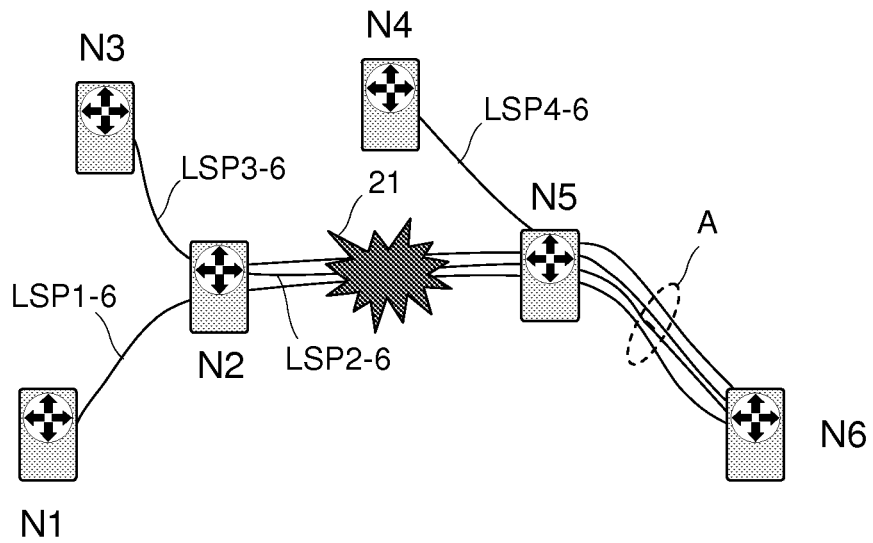
FIG. 2 shows a fault occurring in the network of FIG. 1.

FIG. 2 shows a scenario in which a fault 21 has occurred on the link between Nodes N2 and N5. We will assume that connections LSP1-6, LSP2-6 and LSP3-6 are all carried by the same physical link which is affected by fault 21. Consider that node N6 is configured to cause a protection switch for all connections in group A when 50% of the connections in group A report a fault. This requires two of the four connections to report a fault. Following the occurrence of the fault 21, the OAM signalling mechanisms on each of the connections will inform node N6 that connections are faulty. For example, if the periodic CC signalling for LSP2-6 and LSP3-6 is not received by node N6 within the predetermined period, node N6 will meet the fault condition for group A and cause a fault condition to be declared. Once Node N6 detects that two of the LSP tunnels in protection group A have failed an immediate protection switch is performed, according to the actual protection scheme used, for all of the connections in group A. Node N6 does not need to wait for any other members of protection group A to report a fault condition. Therefore, node N6 does not wait for LSP1-6 to report the fault 21. Of course, detection processing can continue on the other connections. In this example, the working path of LSP4-6 is not faulty, but the protection switching operation for group A will be performed on LSP4-6 due to its belonging to the protection group A.

Figure 3:
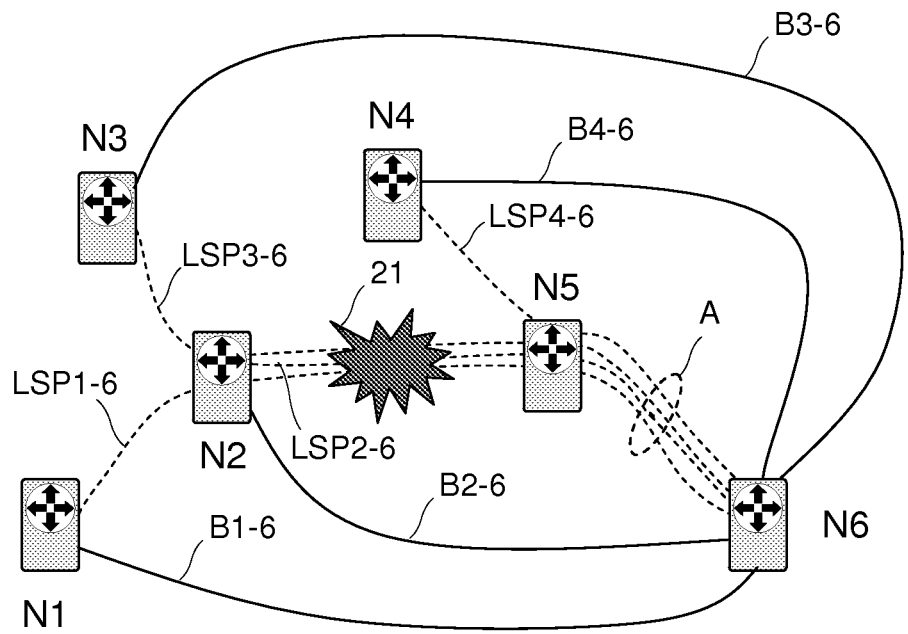
FIG. 3 shows back-up paths for the working paths in the recovery (protection) group.

FIG. 3 shows a set of backup paths B1-6, B2-6, B3-6, B4-6 for the working paths LSP1-6, LSP2-6, LSP3-6, LSP4-6. Backup path B1-6 connects node N1 to node N6 via a different routing to the working path of LSP1-6. A backup path will typically pass via one or more intermediate nodes which, for clarity, are not shown in FIG. 3. FIG. 3 schematically shows three differently routed backup paths although it is possible for multiple backup paths to share at least some physical resources.

Figure 4:
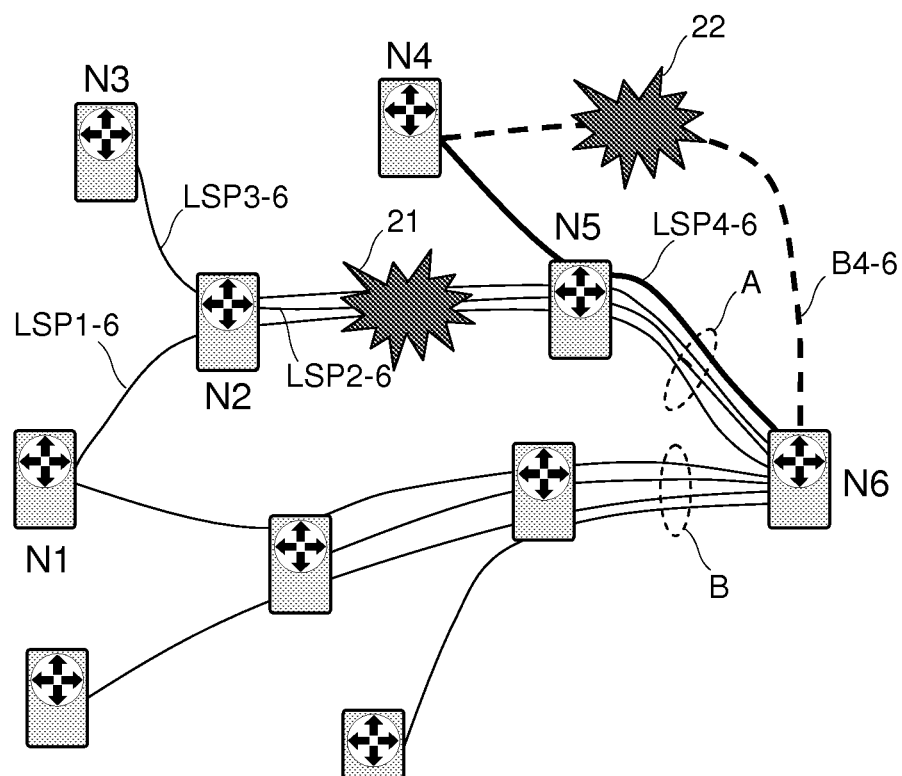
FIG. 4 shows a scenario in which multiple faults occur in the network.

If resilience against a single failure is enough, the mechanism described so far is satisfactory. Some additional mechanisms are desirable if resilience is required against double faults. FIG. 4 shows a scenario in which fault 21 has occurred on the physical link between Nodes N2 and N5 and, in addition, a fault 22 has occurred on the backup path B4-6 between Nodes N4 and N6. The backup path B4-6 between Nodes N4 and N6 is the backup path for LSP4-6. If the protection group A behaves as described previously, traffic will be transferred from the working path LSP4-6 to the backup path B4-6 on which fault 22 exists. This is undesirable. Therefore, a different behaviour is required when a fault condition occurs on a backup path. The working path LSP4-6 corresponding to the backup path on which fault 22 has occurred is temporarily removed from protection group A. The finite state machine that triggers the protection mechanism must perform a different action because Signal Fail (SF) of the backup path has higher priority than every action that switches traffic to the failed path.

There is another scenario to consider. In a case where a fault 21 has occurred on the physical link between Nodes N2 and N5, protection switching occurs for all of the working paths in the protection group A. After protection switching has occurred, a fault may occur on the backup path B4-6. However, because the original working path LSP4-6 was not at fault, it is still a valid path to carry traffic between nodes N4 and N6. Therefore, this member (LSP4-6) is temporarily removed from the protection group and treated independently, so that traffic can use the initial (not failed) path LSP4-6.

Figure 5:
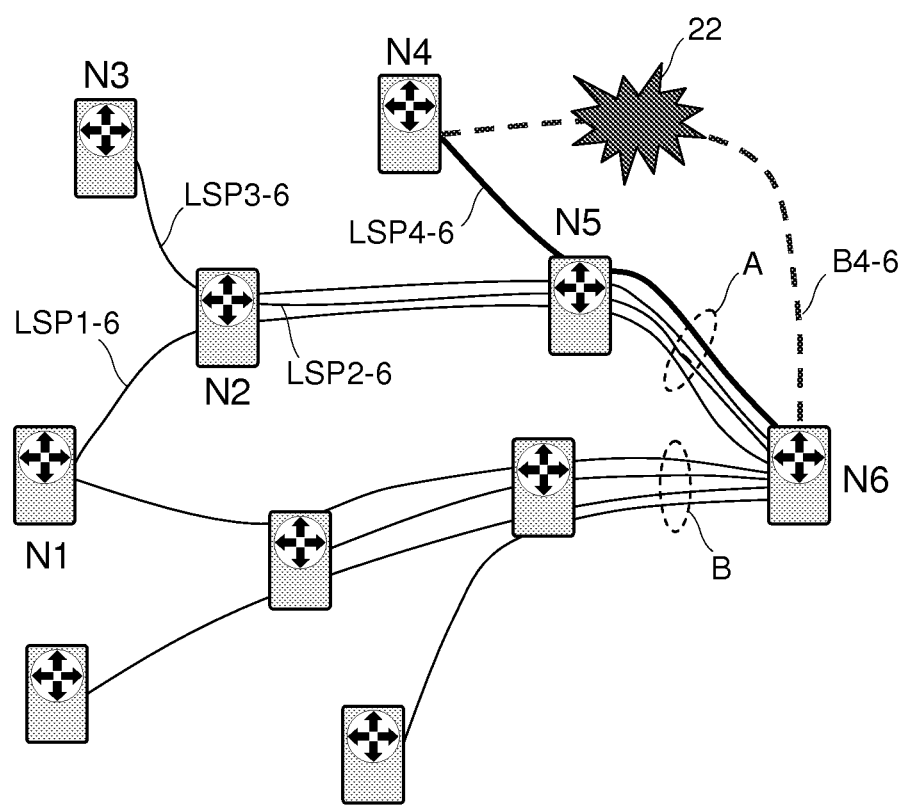
FIG. 5 shows a scenario in which a fault occurs in a back-up path of one of the connections in the network of FIG. 1.

The same mechanism of temporarily removing a member of the protection group can also apply when the backup path is failed in the presence of no other failure, as shown in FIG. 5. In this case, even though there is no impact on the group due to the failure of the protection path of LSP4-6, the working LSP4-6 will be temporarily removed from the protection group, until its associated backup path becomes available again. In this way, even in case of double faults which can affect a protection group as in the example given in FIG. 4, no misbehaviour will occur. Indeed, no switch to a failed resource will ever happen and no status misalignment will ever occur among the members of the group.

For the behaviours just described node N6 requires knowledge of the administrative status (i.e. working or protecting) of the connections within the group. In the example just described member LSP4-6 is returned to the protection group as soon as it returns to the same status as the other members of the protection group.

There are two main ways in which protection switching can operate: (i) revertive operation and (ii) non-revertive operation. With revertive operation, the same network path is always used as the working path for a connection between a pair of nodes, in the absence of a fault. When a fault occurs on the working path, traffic is transferred from the working path to a backup path between the pair of nodes. Traffic is transferred (reverted) to the original working path when the fault is repaired. With non-revertive operation, traffic is transferred to a backup path when a fault occurs on the working path. The backup path is then designated as the new working path, and there is no subsequent operation to transfer (revert) traffic to the path which originally served as the working path.

It has been summarised above how a set of connections in a protection group are normally treated as a single group, and how traffic is normally switched for all connections in the group when a condition is met. It has also been described how there are some situations where it is desirable to remove a connection, or multiple connections, from the group. FIG. 6 shows a table summarising the ways of managing movement of members into and out of a protection group. Generally, for both revertive and non-revertive operation, a connection is taken out of a protection group: (i) when the designated working path is providing service and the backup path associated with that connection is at fault, and (ii) when the designated backup path is providing service and the working path associated with the connection is at fault. For non-revertive operation, traffic remains on the backup path following a fault with the backup path becoming the new working path. The connection can be returned to the protection group when an alternative path becomes available. It is also possible to apply the scheme to a mixed group (i.e. some connections in the group are revertive, some connections in the group are non-revertive) although this is an unlikely case as a network operator will usually make a unique protection strategy choice. For a mixed group, a connection may remain out of the protection group when traffic is carried on the backup path.

Figure 7:
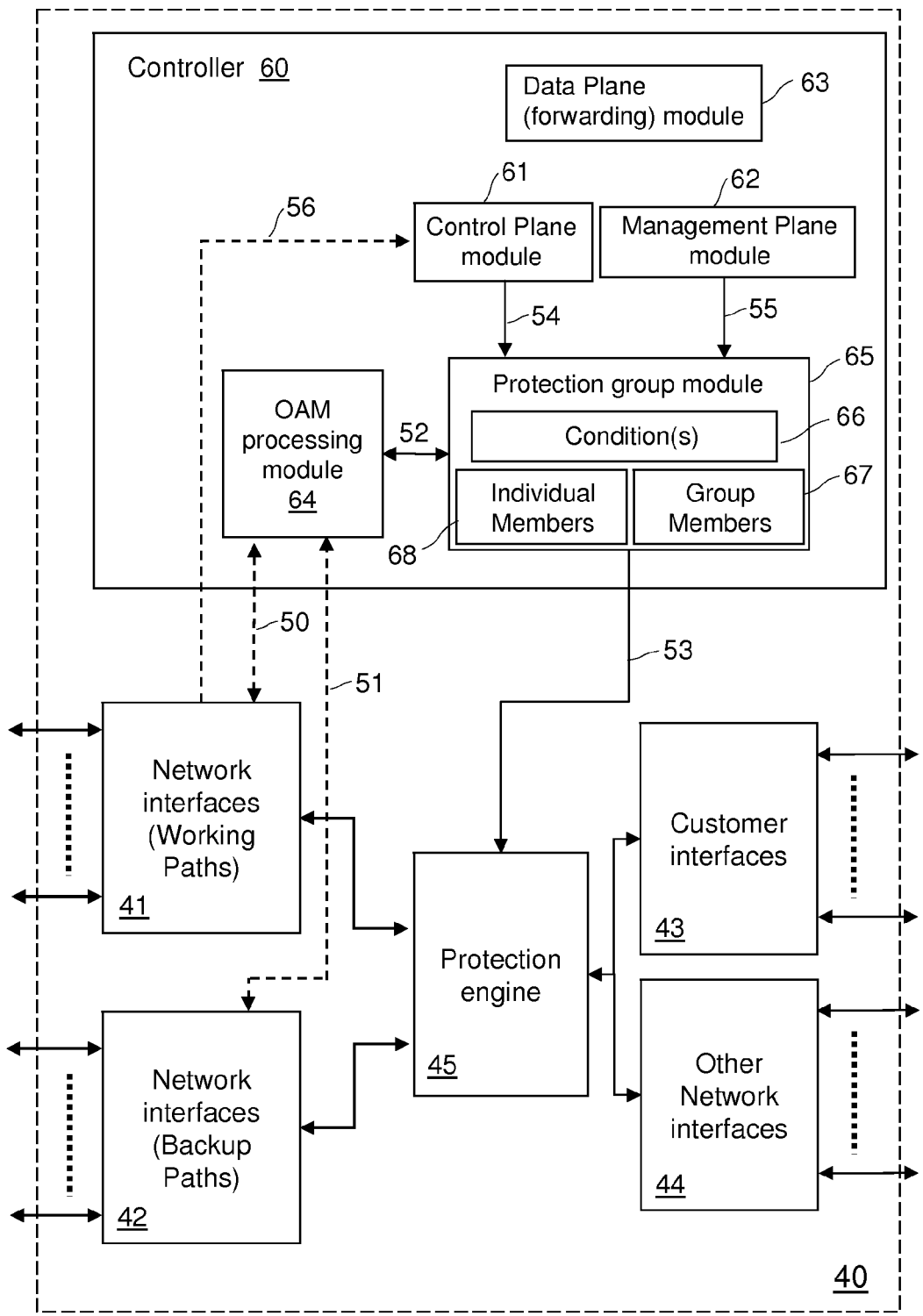
FIG. 7 shows apparatus at a node in the network of FIG. 1.

FIG. 7 schematically shows a network node 40 which manages a protection group, such as node N6 in FIG. 1. The network node 40 has network interfaces 41, 42 for receiving transport units (e.g. packets or frames of data) from other network nodes. Network interfaces 41, 42 terminate the working path connections and backup path connections previously described. Network interfaces 41, 42 also receive OAM messages from other network nodes. Node 40 also has interfaces 43, 44 for forwarding traffic to other nodes. If node 40 is an edge node of a network, it is provided with a set of customer interfaces 43 for forwarding received transport units to customers.

Controller 60 comprises a set of functional modules 61-65 which control operation of the network node 40. Data plane forwarding module 63 performs the normal forwarding of transport units according to a locally stored forwarding table. This is a conventional function of a node and does not need to be described further. The OAM processing module 64 supports OAM functionalities. It sends and receives OAM signalling 50, 51. It receives OAM signalling, such as Continuity Check and FDI signalling, from network interfaces 41, 42 and uses this to determine the occurrence of a fault/failure of a link or node. A protection group module 65 receives inputs 52 from the OAM module 64 and performs logic (shown in FIGS. 8A and 8B) to determine when a switch to a backup path should occur. The protection group module 65 includes: conditions 66 to be met to declare the protection group failed and to cause a protection switch to occur for the entire group of connections; group members 67 for which the protection group applies; individual members 68 which are removed from group members 67 and for which individual protection applies.

Protection engine 45 performs switching of traffic for the group members and individual members on the basis of inputs 53 from the protection group module 65.

Controller 60 can also comprise a control plane module 61 which receives control plane signalling 56 from the network interfaces 41, 42. The control plane module 61 receives control plane signalling 56 to configure a protection group, and issue instructions 54 to configure the protection group module 65. Controller can also comprise a management plane module 62 which receives management plane signalling from the network interfaces 41, 42. The management plane module 62 receives management plane signalling to configure a protection group, and issue instructions 55 to configure the protection group module 65. Although not shown in FIG. 7, controller 60 may also have an input for receiving configuration signalling from a Local Craft Terminal.

The set of modules shown in FIG. 7 can be implemented as blocks of machine-executable code, which are executed by a general purpose processor or by one or more dedicated processors or processing apparatus. The modules can be implemented as hardware, or a combination of hardware and software, for example as a Field Programmable Gate Array (FPGA), Application Specific Integrated Circuit (ASIC) or Application Specific Standard Product (ASSP). Although the functionality of the apparatus are shown as set of separate modules, it will be appreciated that a smaller, or larger, set of modules can perform the functionality.

Figure 8A:
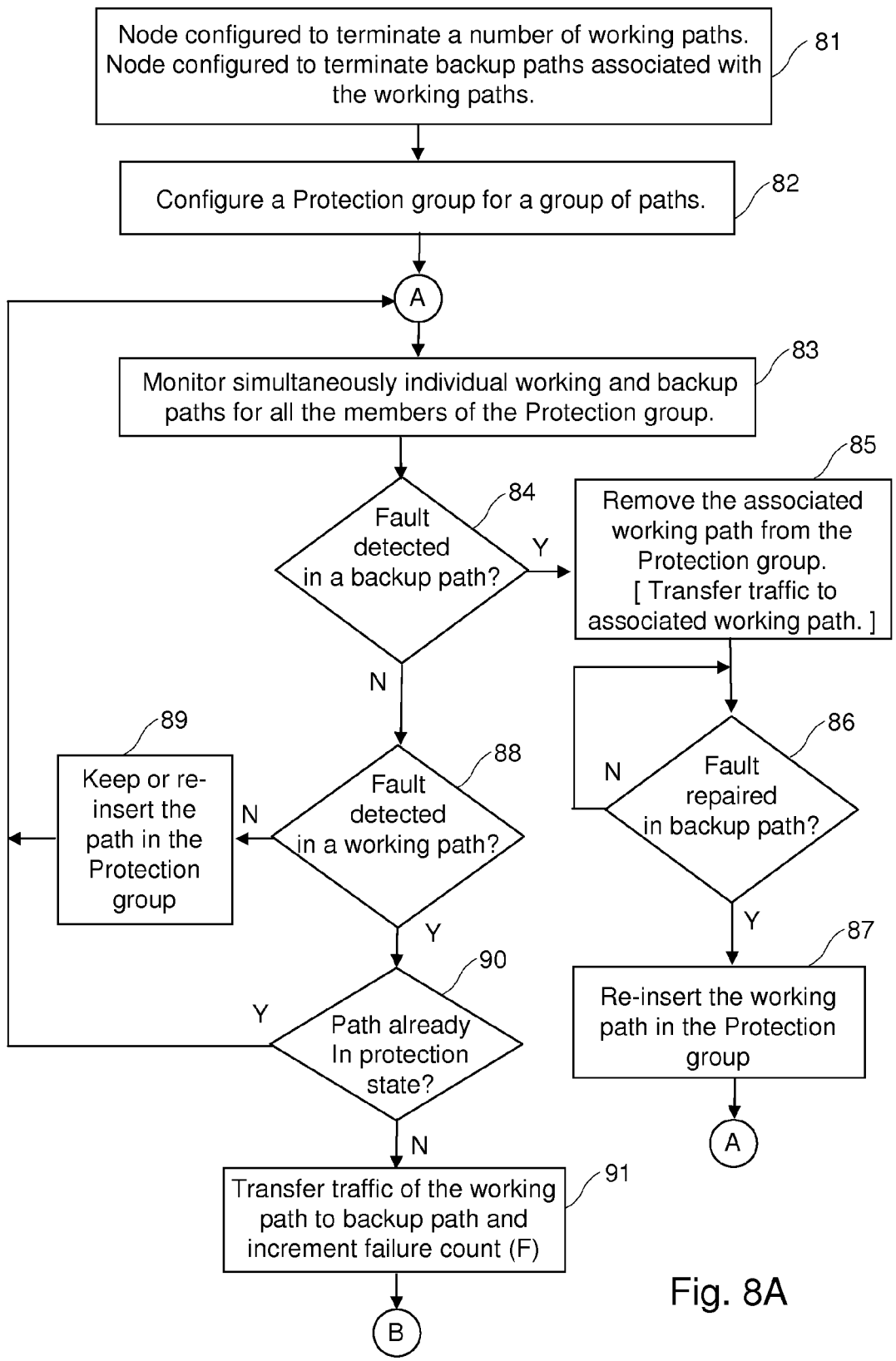
FIGS. 8A and 8B show a method of operating a node in the network of FIG. 1.
Figure 8B:
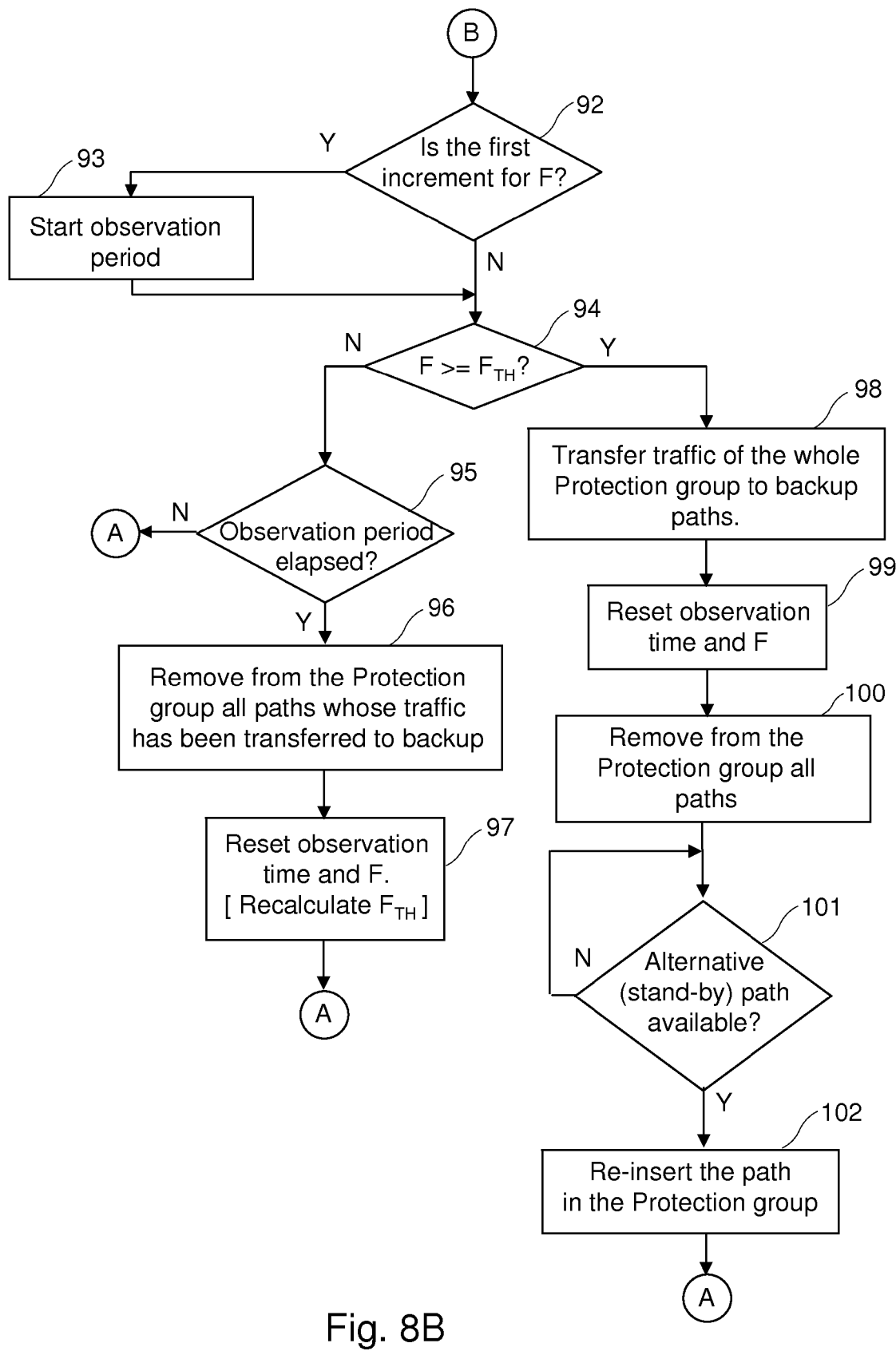

FIGS. 8A and 8B show an embodiment of a method of operating a node N6 in a network. Steps 81 and 82 relate to the initial configuration of connections at the node. The configuration can be performed locally at the node, such as by using a Local Craft Terminal, by the management plane (MP) or by control plane (CP) signalling. At step 81 the node (e.g. node N6 of FIG. 1) is configured to form part of a working path of a connection and to form part of a backup path of a connection.

At step 82 the node configures a protection group. The configuration of a protection group can occur at a later time from the initial configuration of connections at step 81. The node can receive instructions to configure the protection group in various ways, such as via the MP or CP, or by local configuration of the node. The protection group is a group of connections for which a protection switch will occur for all group members once a threshold condition is met (e.g. a number of connections reporting a fault). The configuring of a Protection group includes identifying connections that are to form part of the same group and details of the threshold condition, or conditions, used to make a protection switching decision. Network operators will administratively configure the members of the protection groups that they intend to use depending on their network requirements and on the fault occurrence analysis in their networks. Then, depending on the network topology and the traffic patterns, they will decide what protection group failure threshold is appropriate for their networks (it is a sort of "sensitivity" threshold). The higher the threshold and more time may be needed to actually complete the protection switching of the whole group. The lower the threshold and more likely protection switching will be performed on non-failed LSPs or PWs.

Steps 83-102 relate to operation of the protection group. At step 83 each connection in the group is monitored in a conventional way, such as by detecting CC messages within a predetermined time period, by receiving an FDI message or by receiving an APS message. Backup paths are also monitored for faults. Steps 84 and 88 use the results of the monitoring performed at step 83. At step 84 a check is made if a fault was detected in a backup path. If a fault was detected in a backup path, then the working path associated with that backup path is removed from the failure detection group at step 85. Traffic can be transferred to the working path associated with the backup path, if the working path is not at fault. This is the scenario described with respect to FIG. 4. Step 86 detects when the fault in the backup path is repaired. When the fault is repaired, the method proceeds to step 87 and the working path associated with that backup path is re-inserted in the protection group.

Returning to the processing of the results of step 83, step 88 checks if a fault was detected in a working path. If a failure was not detected in a particular working path, then the method proceeds to step 89 and the working path remains in the protection group, or is re-inserted into the protection group. If a failure was detected in a particular working path, then the method proceeds to step 90. If the working path is already in a protection state, then no further action is required. However, if this is the first detection of the occurrence of a fault in the working path, then the method proceeds to step 91. Traffic is transferred from the working path to the associated backup path and a parameter F, indicative of the number of working paths in failure, is incremented. The method proceeds to FIG. 8B. Step 91 ensures that the node quickly takes action when an individual working path is found to be at fault.

Step 92 checks if this is the first increment of parameter F. If this is the first increment of parameter F, an observation period is started at step 93. Otherwise, the method proceeds to step 94. Step 94 checks if the parameter F has a value greater than a threshold value $F_{TH}$. This indicates that at least the threshold number of members of the protection group have been found to be at fault.

At step 94, if the parameter F has a value less than the threshold value $F_{TH}$ this indicates that less than the threshold number of members of the protection group have been found to be at fault. Step 95 checks if the observation period has expired. If the observation period has not expired, the method returns to point A to continue monitoring the connections. If the observation period has expired, the method proceeds to step 96 and removes, from the protection group, all working paths for which traffic has been transferred to backup paths. Step 97 resets the observation time and parameter F. Optionally, at step 97, the method can calculate a new value for the threshold parameter $F_{TH}$ based on the number of active connections remaining in the protection group, i.e. the number of connections which have not been removed from the group at step 96.

Returning to step 94, if the parameter F has a value equal to, or greater than, the threshold value $F_{TH}$ the method proceeds to step 98 and traffic is transferred from the working paths of all members of the protection group to respective backup paths. It should be understood that the traffic of individual members of the group found to be at fault will already have been transferred at step 91 to a respective backup path during this iteration of the method, or one of the earlier iterations of the method. It is only traffic of other members of the protection group which have yet to report a fault which still need be transferred at step 98. Step 99 resets the observation time and parameter F. Step 100 removes all of the working paths from the protection group. Step 101 checks when an alternative path becomes available again and, at step 102, returns the associated working path to the protection group and returns to point A. Steps 101 and 102 are repeated for each path that was removed at step 100. The action taken at step 98 will sometimes have the effect of transferring traffic from a working path which is not at fault. This is the scenario shown in FIG. 2, where a fault 21 does not affect the working path LSP4-6, but traffic is transferred from LSP4-6 to B4-6 because it forms part of protection group A. Connections which are not at fault already have a functioning alternative path and can be returned to the protection group at step 102. This can occur immediately, or after a configurable time.

For non-revertive operation, traffic remains on the path to which traffic was transferred at step 91 or 98 and no further steps are required. The path currently being used is deemed the "providing service path" and the path not currently carrying traffic is deemed the "stand-by path". For revertive operation, traffic is subsequently transferred back to the designated working path when the fault is repaired.

The observation period used in steps 93 and 95 is a configurable parameter. A failure in the network is likely to cause all relevant connections to be faulty at about the same time. There is some degree of uncertainty because not all OAM messages are synchronous. The observation period allows the method to wait a short period for other fault messages. As a practical example, consider OAM messages are sent every 3.3 ms, with a fault declared after 3.5×3.3 ms (=11.55 ms.) The first increment of F occurs after the first detection of a fault at 11.55 ms, and the observation period is also started at this point. A "storm" of failure detections should follow. The observation period can be set, for example, to a value of a couple of ms, thereby allowing the node to detect a fault condition on most of the connections, without needing to wait for all of the connections to report a fault condition. It is possible to set the threshold value $F_{TH}$ to a value of 1, such that the entire group of working paths is switched when a single working path reports a fault. In this case, the observation period is not required and steps 92, 93, 97 of the method which use the observation period are omitted.

FIGS. 8A and 8B show an advantageous embodiment of the invention where there is a preconfigured backup (protection) path for each working path. The group of working paths is called a protection group. The invention can be applied to restoration of traffic, in which backup paths are configured on demand. For a traffic restoration embodiment, the method shown in FIGS. 8A and 8B is adapted such that step 83 only monitors working paths (since no backup paths exist before a fault is detected) and steps 84-87 can be omitted. In steps 91 and 95, a backup path is configured on demand at the time of performing those steps.

FIG. 7 shows a node where the recovery group is configured. Other nodes in the network can be adapted to support the configuration of the recovery group. Other nodes which support the configuration of the recovery group can include a Network management entity, a Control Plane entity and a Local Craft Terminal. To configure a recovery group, configuration information is signalled from one of these other nodes to the node where the recovery group is to be configured. Extensions to signalling protocols can convey the configuration information. The configuration information includes:

- information identifying the connections which are to form part of the recovery group;
- information identifying the backup path associated with each connection;
- a condition, or conditions, for causing the traffic of the group to be switched to backup paths (e.g. the threshold value $F_{TH}$);

any other parameter used by the protection engine, such as the length of the observation period.

The description above refers to "removing" and "returning" members from a recovery/protection group. It will be understood that data corresponding to a member does not have to be physically removed from a list of group members. A field or flag can be set to "1" or "0" to indicate whether a particular member is currently "in" or "out" of the list of recovery/protection group members.

In the case of hubbed traffic patterns in the network, as typically occur with residential applications, the head end node will typically collect all, or most, of the traffic arriving from peripheral nodes. The head end node is challenged with the need to terminate a potentially massive number of LSP tunnels, with their relevant protection. A signalling mechanism can allow even higher performance by informing the transmitting side to switch a certain number of connections (e.g. LSP tunnels or PWs) which belong to a given protection group at the receiving side. The protection groups at the end points typically will not comprise the same members. As an example, the receiving end will comprise a superset of members compared to the transmitting end. This means that such signalling will generally need to be exchanged between each receiving node and a number of transmitting nodes. This extension is however manageable and requires proprietary messages or standard based "group messages" to be exchanged between the receiving node and the transmitting nodes associated with a given protection group. In particular, node N6 can send ad-hoc messages (via OAM or the control plane) to the source nodes of the connections which belong to a recovery group to inform them of the status of their connections, thus allowing also the other end of the connections to take actions. This is particularly advantageous for restoration mechanisms.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of performing fault detection and traffic recovery at a first node in a connection-oriented network, the network comprising a plurality of connections which are terminated at the first node, the method comprising:
configuring at the first node a recovery group comprising at least two of the plurality of connections;
performing fault detection over each of the connections in the recovery group;
determining if at least one recovery group fault condition is met, based on results of the fault detections performed over the connections in the recovery group;
when the at least one recovery group fault condition is met, causing traffic on all of the connections in the recovery group to be transferred to backup paths; and
when the at least one recovery group fault condition is not met, and a fault has been detected on a connection in the recovery group, causing traffic to be transferred from that connection to a backup path associated with that connection,
wherein at least one of the connections of the recovery group has a different end node to other connections in the recovery group; and
wherein the backup paths do not form part of the recovery group.

2. A method according to claim 1 further comprising dynamically changing a number of connections in the recovery group based on at least one of:
the transfer of traffic to the backup paths; and
the fault detections performed over the backup paths.

3. A method according to claim 2 comprising temporarily removing a connection from the recovery group when traffic is transferred from that connection in the recovery group to the backup path associated with that connection.

4. A method according to claim 3 wherein that connection is returned to the recovery group when that connection is available again.

5. A method according to claim 2 wherein a first connection in the recovery group is temporarily removed from the recovery group when a fault is detected in the backup path associated with the first connection.

6. A method according to claim 5 wherein the first connection is returned to the recovery group when the backup path is available again.

7. A method according to claim 2 wherein at least one of the connections in the recovery group is operated in a non-revertive manner following transfer of traffic from that connection to a backup path associated with that connection, with the traffic remaining on the backup path and that connection being returned to the recovery group when an alternative path is available again.

8. A method according to claim 1 wherein the at least one fault condition is detection of a fault on a predetermined proportion, or number, of the connections in the recovery group.

9. A method according to claim 8 further comprising calculating the proportion, or number, of the connections in the recovery group required for the declaration of the fault condition based on the number of active connections in the recovery group.

10. A method according to claim 1 wherein at least one of the backup paths associated with the connections in the recovery group has a different end node to other backup paths associated with the connections in the recovery group.

11. A method according to claim 1 wherein at least one of the backup paths is a preconfigured protection path.

12. A method according to claim 1 wherein the fault detection comprises receiving Operations, Administration and Maintenance (OAM) signalling.

13. A method according to claim 1 wherein the connections are at least one of: Multi-Protocol Label Switching (MPLS); Multi-Protocol Label Switching Transport Profile (MPLS-TP); Connection-oriented Ethernet.

14. Apparatus for use at a first node of a connection-oriented network, the network comprising a plurality of connections which are terminated at the first node, the apparatus comprising:
an input arranged to receive instructions to configure a recovery group comprising at least two of the plurality of connections;
a first module arranged to perform fault detection over each of the connections in the recovery group; and
a second module arranged to determine if at least one recovery group fault condition is met, based on results of the fault detections performed over the connections in the recovery group, the second module being further arranged to:

when the at least one recovery group fault condition is met, cause traffic on all of the connections in the recovery group to be transferred to backup paths and when the at least one recovery group fault condition is not met, and a fault has been detected on a connection in the recovery group, cause traffic to be transferred from that connection to a backup path, wherein at least one of the connections of the recovery group has a different end node to other connections in the recovery group; and wherein the backup paths do not form part of the recovery group.

15. A method of configuring fault detection and traffic recovery at a first node in a connection-oriented network, the network comprising a plurality of connections which are terminated at the first node, the method comprising, at a node separate from the first node:

signalling to configure a recovery group at the first node, wherein the signalling:

defines a recovery group comprising at least two of the plurality of connections terminated at the first node;

defines at least one recovery group fault condition which must be met, to cause a recovery group fault condition to be declared for all of the connections in the recovery group;

wherein when the at least one recovery group fault condition is met, traffic on all of the connections in the recovery group will be transferred to backup paths, and when the at least one recovery group fault condition is not met, and a fault has been detected on a connection in the recovery group, traffic will be transferred from that connection to a backup path associated with that connection, wherein at least one of the connections of the recovery group has a different end node to other connections in the recovery group; and wherein the backup paths do not form part of the recovery group.

16. A computer program product comprising non-transitory machine-readable instructions which, when executed by a processor, perform the method according to claim 1.

17. The apparatus of claim 14, wherein at least one backup path associated with the connections of the recovery group has a different end node to other backup paths associated with the connections of the recovery group.

18. The method of claim 15, wherein at least one backup path associated with the connections of the recovery group has a different end node to other backup paths associated with the connections of the recovery group.

19. The method of claim 5, wherein the first connection is temporarily removed from the recovery group even when the first connection is not faulty.

\* \* \* \* \*